Dec. 19, 1939.  E. C. McRAE  2,184,193
BATTERY CHARGE RESPONSIVE MEANS
Filed Nov. 9, 1935  2 Sheets-Sheet 1
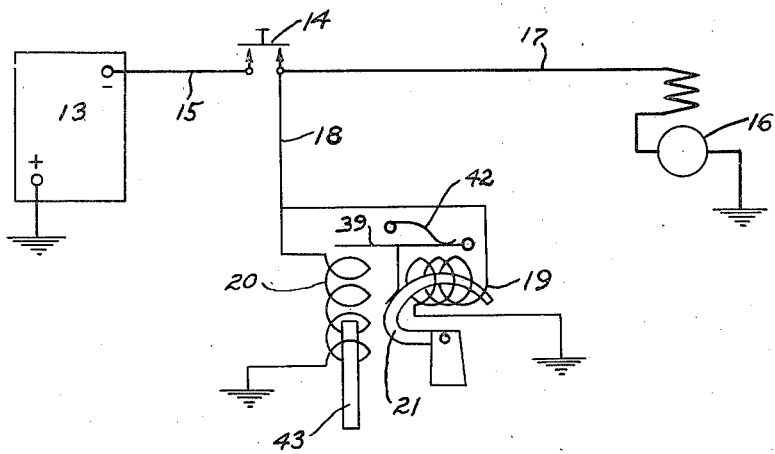
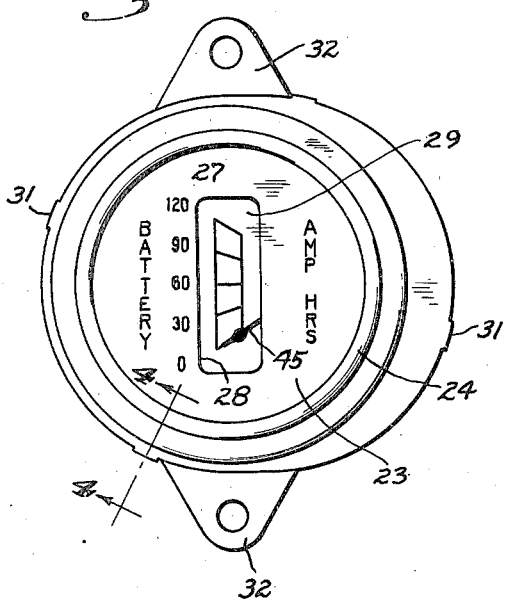
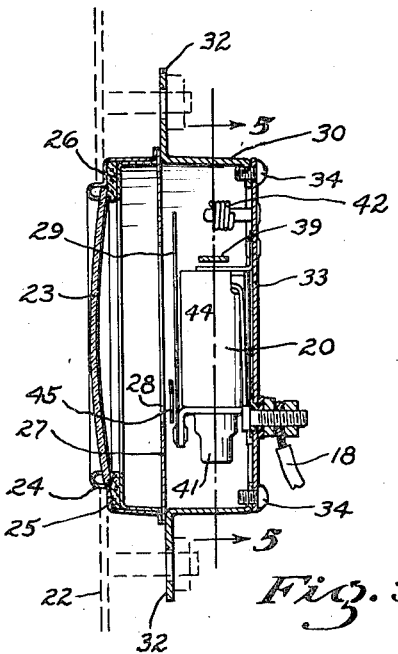
INVENTOR.
Edwin C. McRae
BY
ATTORNEY.

Dec. 19, 1939. E. C. McRAE 2,184,193
BATTERY CHARGE RESPONSIVE MEANS
Filed Nov. 9, 1935 2 Sheets-Sheet 2
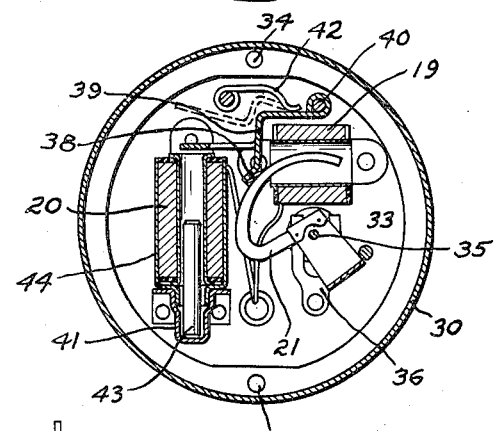
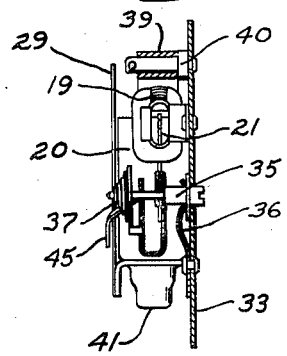
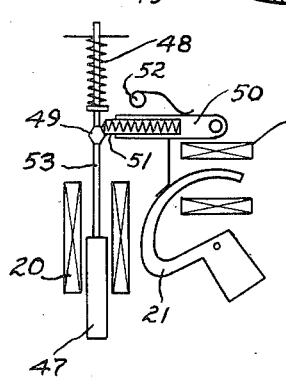
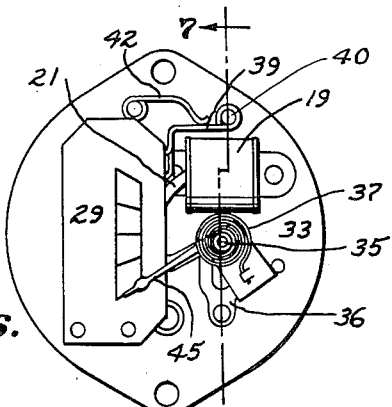
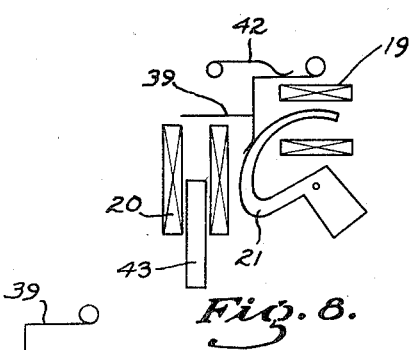
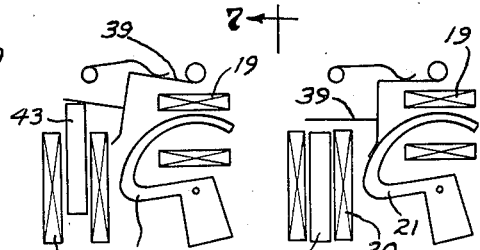
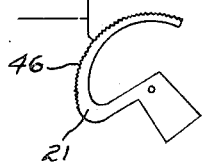
INVENTOR.
Edwin C. McRae
BY
ATTORNEY.

Patented Dec. 19, 1939

2,184,193

UNITED STATES PATENT OFFICE 2,184,193

BATTERY CHARGE RESPONSIVE MEANS

Edwin C. McRae, Huntington Woods, Mich.

Application November 9, 1935, Serial No. 49,098

6 Claims. (Cl. 171—95)

A combination including this invention is described in my application Serial No. 75,682.

The object of my invention is to provide a new method of ascertaining the condition of charge in batteries, especially the battery used in a motor vehicle for operating the electric starter.

A further object of my invention is to provide a unique instrument which will, at all times, register the approximate degree of charge in a vehicle battery. Heretofore, there has been no convenient method whereby a vehicle operator could ascertain the condition of his battery, the ordinary hydrometer or other battery testing equipment not usually being available or their use understood by the average driver.

My improved apparatus is preferably incorporated into the vehicle, the indicator thereof being positioned upon the instrument panel of the car, and its operation being entirely automatic so that the operator need only look at the indicator at any time to ascertain the charge in the battery.

The device has the general appearance of a conventional ammeter; however, its operation is entirely independent of the rate at which the battery is being charged, the device indicating only the amount of available energy remaining in the battery at any time. The conventional ammeter registers only the rate at which the battery is being charged or discharged, but gives no indication whatever of the amount of energy present at any time in the battery. For this reason, many cars are being operated with batteries only partially charged, even though the vehicle generator is charging the battery at an apparently adequate rate.

A reduction in available battery energy may be caused by a number of conditions, such as the increased use of accessories, i. e., radio, heating fans, lights, etc., or by a partially worn out battery. Increasing the generator charging rate will usually compensate for the first of these conditions but will not correct a faulty battery. For this reason the ammeter of a car only indicates whether or not the generator is functioning properly and does not register the amount of energy remaining in the battery.

An important function of my device is that it provides a warning indication to the operator before the amount of energy in his battery is reduced to the point where it will not start the car. The operator may therefore have the car inspected and the fault corrected before the battery is discharged to the point where its failure will seriously inconvenience him.

A further feature of my device is that, by its use, overcharging of the battery can be avoided without encountering the danger of, at some time, having a dead battery. The output of the generator may be increased until the battery is about ninety per cent charged and then the output lowered to maintain this condition. If extraordinary conditions are encountered, such as excessive night driving, the battery charge will gradually lower, but the operator will be apprised of this condition as it proceeds so that he may again increase the generator output long before the danger point has been reached. Heretofore, the generator charge was usually adjusted to keep the battery charged under all conditions, and consequently the battery was being overcharged most of the time. A material lengthening of the life of the battery may, therefore, be expected by the use of this device.

My improved device operates upon the well known principle that the ampere hour capacity of a storage battery may be determined by measuring the battery voltage under an appreciable load. The voltage under such conditions gives a true indication of the battery charge. Numerous battery meters have been produced which operate on this principle; however, such meters draw a large amount of current from the battery and are not suitable for use by the average motorist. Furthermore, such a meter gives no indication except when the load is being applied, so that this type of meter cannot be connected continuously. The meter would, therefore, be of little or no value if installed upon the instrument board of a car.

Briefly, my improved meter records the battery voltage during the period that the starting motor is cranking the engine. The battery is, therefore, working under a load of about 300 amperes when the voltage is registered. Means are provided for taking this reading during the first fraction of a second that the starting is connected, or before the starting motor has started to rotate. The variable current consumption of the starting motor, due to temperature changes and other conditions, does not affect the voltage reading for this reason. The indicator on the meter remains fixed between successive operations of the starting motor; however, the reading is corrected for any change in battery condition at each successive operation of the starting motor switch. A very close approximation to a truly correct reading is, therefore, obtained at all times.

The above mentioned procedure is the preferred method; however, it may be permissible, under some conditions, to take the voltage reading at any time that the starting motor is being operated. Furthermore, it may be found desirable to periodically load the battery by means other than the starting motor while taking the voltage reading. The unique steps of my invention are believed to be the periodic loading of the battery while simultaneously obtaining voltage readings, and maintaining these readings between successive applications of the load. Thus, the inertia of the voltmeter indicator is negatived so that the indicator will only be required to move upon each application through a distance corresponding to any change in voltage which has occurred between the successive applications. This change is usually very slight, so that a very accurate indication is obtained even though a heavy voltmeter armature is used and the reading is taken in only a fraction of a second.

Under certain conditions and with a very light and sensitive armature, it may, however, be found desirable to maintain the voltage reading only a portion of the period between applications of the load.

With these and other objects in view, my invention consists in the several steps comprising my improved method together with the arrangement, construction and combination of the various parts of my improved device, as described in the specification, claimed in my claims and illustrated in the accompanying drawings, in which:

Figure 1 shows a wiring diagram of the combination of vehicle battery, switch, starting motor and meter.

Figure 2 shows a detailed plan view of my improved meter, adapted for installation upon a vehicle instrument panel.

Figure 3 shows a vertical central sectional view through the meter shown in Figure 2.

Figure 4 shows a sectional view, taken on the line 4—4 of Figure 2.

Figure 5 shows a sectional view, taken on the line 5—5 of Figure 3.

Figure 6 shows a plan view of the backing plate of my meter, the several parts of the device being mounted in position upon this backing plate.

Figure 7 shows a sectional view, taken on the line 7—7 of Figure 6.

Figure 8 is a diagrammatic view illustrating the position of the various parts when the starting motor of the vehicle is idle.

Figure 9 is a diagrammatic view illustrating the position of the several parts of the device an instant after the starting motor switch has been depressed.

Figure 10 is a diagrammatic view illustrating the position of the several parts of the meter when the starting motor is in operation.

Figure 11 is a diagrammatic view showing an alternate construction which may be employed if desired, and Figure 12 is a diagrammatic view, illustrating still another alternate construction which may be used in place of the preferred device shown in Figures 1 through 10.

Referring to Figure 1 of the accompanying drawings, I have used the reference numeral 13 to indicate a conventional vehicle storage battery, the positive terminal of which is grounded and the negative terminal of which is connected by means of a cable 15 to one terminal of a starting motor switch 14. The other terminal of this starting motor switch is connected to a starting motor 16 by means of another cable 17. The device functions in the usual manner in that when the switch 14 is closed the starting motor is energized to crank the engine of the vehicle.

The aforementioned apparatus comprises the conventional starting motor installation, so that this equipment per se forms no part of this invention, except insofar as it combines with the meter, about to be described, to produce a new result.

A lead 18 extends from the starting motor side of the switch 14, preferably to the instrument panel of the car, and forms the sole wire connection between my meter and the battery system. The meter proper comprises a voltmeter energizing coil 19, one terminal of which is fixedly connected to the lead 18 while the other terminal is grounded. A solenoid 20 likewise has one terminal fixedly connected to the lead 18, the other terminal being grounded. Thus, at all times when the switch 14 is closed, both coils 19 and 20 will be energized by the battery. A voltmeter armature 21 is pivotally mounted so as to be acted upon by the coil 19, this armature being spring resisted whereby variations in battery voltage will draw the armature proportionally into the coil 19. The coil 19 and armature 21 are of a conventional type and show only one form of volt indicating apparatus which is suitable for use herein. Other types of volt indicating apparatus may be used, as it is only essential that the voltage impressed upon the coil 19 proportionately actuates some indicating device.

This type of armature is to be recommended for the reason that a frictional resistance is applied to the armature which normally retains it so that it cannot move either in or out of the coil 19 except when the resistance is released. The solenoid 20 functions to momentarily release the frictional resistance from the armature 21 for a fraction of a second at the instant the switch 14 is closed, so that the armature 21 will respond to the battery voltage during this short interval. At this instant the motor forms a dead short across the battery. No appreciable back E. M. F. is built up in the motor until the armature is rotating. For this reason a nearly constant load is applied to the battery at the instant of engagement of the starting motor, irrespective of the current consumption of the motor after it engages the engine to crank same. It is therefore desirable that the voltage reading of the battery be taken at this instant, so that the variable current consumption required in cranking will not vary the voltage reading.

Referring to Figures 2 and 3 of the drawings, I have shown a commercial form of my invention which is adapted for installation upon a vehicle instrument board, which board is shown by dotted lines 22. The meter is enclosed in a housing which comprises a bezel 23, mounted in a ring 24, the bezel being held in place by a gasket 25 and retaining ring 26. A plate 27 is mounted in back of the bezel 23, this plate having an aperture 28 therein, through which the scale upon a dial 29 is visible. A casing 30 is adapted to house the working parts of the instrument, the bezel and its retaining members being secured thereto by a plurality of turned down ears 31, as shown in Figure 4. A pair of arms 32 project radially from the casing 30, which arms co-act with suitable studs which extend rearwardly from the instrument panel, the bezel of the instrument being alone visible through a suitable opening in the panel.

It will be noted from Figures 3 and 5 that the relatively large circular opening is provided in the rear face of the casing 30, and that a plate 33 is secured over this opening by means of a pair of screws 34. In the form of device here shown, all of the working mechanism is mounted upon the plate 33 so that it may be conveniently installed in the casing 30.

From Figures 5 through 7 it will be noted that the armature 21 is rotatably mounted upon a pin 35, which pin is secured in position by means of a spring clip 36 with one end of the pin projecting through the plate 33. One end of a hair spring 37 is secured to the inner end of the pin 35 while the other end of this spring is secured to the armature 21. The tension on the hair spring 37 can thereby be adjusted by turning the pin 35 and thus vary the movement of the armature in response to a given voltage in the coil 19.

The armature 21 has an arcuate periphery against which a friction pad 38 is adapted to bear. The pad 38 is mounted upon the intermediate portion of an arm 39, one end of this arm being pivoted at 40 while the free end thereof extends to position directly over the solenoid 20. In the device shown, the solenoid 20 is mounted in a vertical position and is secured to the plate 33 by means of a bracket 41. The free end of the arm 39 does not bear against the solenoid as a spring 42 resiliently urges this arm at all times to position where the pad 38 bears against the armature 21. A plunger 43 is reciprocally mounted within the solenoid 20, the plunger being substantially the same length as the solenoid, so that when the solenoid is energized the plunger will be drawn up to position where its upper end is substantially aligned with the upper end of the solenoid. The solenoid 20 is provided with a casing 44 which forms a magnetic path for the field produced thereby, while the bracket 41 is so formed that, in its inoperative position, the plunger 43 rests upon the bracket with its upper end substantially aligned with the middle portion of the solenoid. The dial 29 is secured to the bracket 41 directly over the solenoid casing 44, this dial being suitably calibrated so that a pointer 45 which is fixed to the armature 21 will be visible in relation to this scale through the aperture 28.

The operation of the device is illustrated in Figures 8, 9 and 10. Figure 8 shows the position of the plunger 43 and arm 39 when the starting motor is not being operated, the car either being driven or being idle. It will be noted that the plunger 43 is in its lower-most position and that the arm 39 frictionally engages the armature 21 and prevents movement of the armature by the spring 42. At the instant the starting motor switch is closed the plunger 43 is drawn upwardly into the solenoid 20. An important result of this initial engagement is that the inertia of the plunger carries it upwardly beyond the upper end of the solenoid so that it strikes against the free end of the arm 39, thereby raising this arm against the resistance of the spring 42 and releasing the frictional engagement of the pad 38 from the armature 21. Both the solenoid 20 and the coil 19 are energized at the same time so that the armature 21 will move to a position corresponding to the voltage of the battery during the momentary released period. The plunger 43 immediately returns to the position shown in Figure 10 so that the arm 39 again engages the armature 21 and prevents further movement of the armature, irrespective of subsequent variations in voltage impressed upon the coil 19. The plunger 43 is held in the position shown in Figure 10 until the starting motor switch 19 is released, at which time it drops back to the position shown in Figure 8 without, of course, contacting with the arm 39.

The hair spring 37 is so tensioned that the armature 21 just starts to move when a voltage is impressed upon the coil 19 which is just sufficient to crank the car under the severest conditions. The hair spring is also designed so that a voltage of approximately 5½ volts, when a 6 volt storage battery is being used, will cause the armature 21 to be drawn into the coil 19 sufficiently that the pointer 45 will be aligned with the top of the scale on the dial 29. Thus, for the average car the meter will register a voltage of from approximately 3 volts to 5½ volts.

To operate the device, the driver simply presses the starting switch 19, which automatically operates the meter to indicate the battery charge. No change in reading is obtained during the normal running of the car, and such is not essential, as during this period the battery is usually being charged. However, should the battery energy be reduced while driving, then the next time the starting motor is operated the meter will register a lower voltage. If this condition is not corrected, each succeeding start of the engine will cause the meter to indicate still lower voltages until the pointer reaches the bottom of the scale. This point indicates the minimum charge in the battery that will, under all conditions, start the car.

It will be apparent that a battery does not ordinarily lose its charge between any two successive starts of the engine, and that on the contrary most failures are gradual, occurring over a period of weeks. Consequently, if the operator only occasionally glances at the meter he will be warned in ample time should the charge in the battery be receding near the minimum required. He is thus given the opportunity to have the trouble remedied before he is inconvenienced by having the battery incapable of starting the car.

Referring to Figure 11, I have shown an alternate construction wherein the arcuate edge of the armature 21 is serrated, as at 46, and wherein the friction pad 38 is dispensed with and a knife edge is formed on the arm 39 which co-acts with the serrations 46 to thereby positively hold the armature 21 in any one of its positions.

In Figure 12, I have shown still another alternate construction wherein the inertia of the plunger 43 is dispensed with in intermittently operating the arm 39, the intermittent operation being accomplished by cam action. In this construction a solenoid plunger 47 is provided, which is resiliently urged by a spring 48 to the position shown in Figure 12, the plunger having an extension 53 thereon. A cam 49 is formed on this extension. The arm 39 is substituted by a member 50 which has a spring urged detent 51 reciprocally mounted in its free end, which detent is urged against the extension 53. A stop 52 is provided, which limits the pivotal movement of the member 50. In operation, the coil 19 and solenoid 20 are energized so that the plunger 47 is drawn upwardly, the cam 49 swinging the arm 50 upwardly against the force of the spring 42 by means of its abutment with the detent 51. This causes the pad 38 to be disengaged from the armature 21. As the plunger 47 is drawn upwardly, the cam 49 rides over the detent 51 when the member 50 bears against the stop 52, at which time the spring 42 forces the member 50 downwardly to again engage the armature 21. This action occurs in a fraction of a second so that the armature 21 operates in a manner similar to preferred construction previously described. When the starting motor switch is released, the spring 48 urges the plunger 47 downwardly, the cam 49 riding over the detent 51, but of course at this time urging the member 50 into engagement with the armature 21.

Among the many advantages arising from the use of my improved meter, it may be well to mention that the current drawn by this device is negligible, the windings being energized only when the starting motor is in operation. Furthermore, due to the short intervals during which the windings 19 and 20 are operated, these windings may be materially overloaded. Such a construction would not be desirable in a conventional voltmeter, because the several amperes of current drawn by the meter would cause an appreciable error in the voltage reading when used on many classes of batteries. The foregoing has been mentioned to bring out that in the commercial manufacture of the device, extreme accuracy is not a requisite and that delicate parts are not necessary, sufficient current being available to operate the armature even when the latter has an appreciable weight. The meter registers at all times but the coils therein are only intermittently energized, so that a current consumption which would be prohibitive in other voltmeters may be safely used herein.

Some changes may be made in my improved method and in the arrangement and combination of the various parts of my device without departing from the spirit of my invention, and it is my intention to cover by my claims such changes as may reasonably be included within the scope thereof. I claim as my invention:

1. In combination, a storage battery, means for connecting a substantial load across said battery, and means responsive only to battery voltage momentarily after application of the load for operating in accordance with the condition of said battery.

2. In combination, a storage battery, means for connecting a substantial load across said battery, and a delayed indicating means responsive to battery voltage only after said load has been applied for a small increment of time for operating in accordance with the condition of said battery.

3. In combination, an electric battery, a switch, a load which is constant in starting and variable thereafter connected across said battery through said switch, a voltage responsive means electrically connected across said battery through said switch, means for normally retaining said voltage responsive means in a plurality of its positions, and means actuated simultaneously with the closing of said switch for releasing said retaining means only during the initial portion of said closed period so that said voltage responsive means is allowed to operate in accordance with the voltage of said battery only during the initial period that said load is being applied.

4. In combination, an electric battery, a switch, a motor electrically connected to said battery through said switch, a movable voltage responsive device, means for electrically connecting said voltage responsive device to said battery to operate in accordance with the voltage of the battery only when said switch is closed, means for normally preventing movement of said device from any one of a plurality of its positions, and means for releasing said preventing means during the initial portion of the period when said switch is closed, to thereby allow said device to freely operate in accordance with the battery voltage only during said initial period that said motor is connected.

5. In combination, a storage battery, a switch, a starting motor electrically connected across said battery through said switch, a voltage responsive device electrically connected across said battery only when said switch is closed, a voltage actuated armature in said device, means for normally frictionally retaining said armature in any one of a plurality of its positions against the maximum torque which causes the device to operate, and means for releasing said retaining means only during the initial portion of the period when said switch is closed so as to allow said armature to operate in accordance with the battery voltage only during said initial period, whereby the voltage in accordance with which the position of the device is determined at any time will be the voltage of said battery during the initial period when it last operated said starting motor.

6. In combination, an electric battery, means for connecting a load across said battery, a voltage responsive device, means connecting said voltage responsive device across said battery during the entire period that said load is connected, means for holding said device inoperative against the torque caused by said battery, and means for momentarily releasing said holding means during the initial portion of the period that said load is applied, for the purpose described.

EDWIN C. McRAE.